United States Patent
Walters et al.

(10) Patent No.: US 6,922,044 B2
(45) Date of Patent: Jul. 26, 2005

(54) SYNCHRONIZATION OF MULTIPHASE SYNTHETIC RIPPLE VOLTAGE REGULATOR

(75) Inventors: Michael M. Walters, Apex, NC (US); Xuening Li, Cary, NC (US); Thomas A. Jochum, Durham, NC (US)

(73) Assignee: Intersil Americas Inc., Milpitas, CA (US)

( * ) Notice: Subject to any disclaimer, the term of this patent is extended or adjusted under 35 U.S.C. 154(b) by 106 days.

(21) Appl. No.: 10/673,684

(22) Filed: Sep. 29, 2003

(65) Prior Publication Data

US 2004/0070382 A1 Apr. 15, 2004

Related U.S. Application Data

(63) Continuation-in-part of application No. 10/236,787, filed on Sep. 6, 2002, now Pat. No. 6,791,306.

(51) Int. Cl.[7] ............................................... G05F 1/40
(52) U.S. Cl. .................. 323/288; 323/282; 323/285
(58) Field of Search ................................ 323/282, 283, 323/284, 285, 287, 288, 290, 272, 224, 268, 286; 363/72, 89, 95, 97, 98, 16

(56) References Cited

U.S. PATENT DOCUMENTS

| | | | |
|---|---|---|---|
| 4,413,224 A | 11/1983 | Krupka et al. | 323/284 |
| 4,521,726 A | 6/1985 | Budnik | 323/283 |
| 4,658,204 A | 4/1987 | Goodwin | 323/285 |
| 5,399,958 A | 3/1995 | Iyoda | 323/282 |
| 6,362,607 B1 * | 3/2002 | Wickersham et al. | 323/272 |
| 6,495,995 B2 | 12/2002 | Groom et al. | |
| 6,583,610 B2 | 6/2003 | Groom et al. | |
| 6,819,577 B1 * | 11/2004 | Wiktor et al. | 363/72 |
| 6,825,644 B2 * | 11/2004 | Kernahan et al. | 323/283 |
| 6,841,983 B2 * | 1/2005 | Thomas | 323/322 |

FOREIGN PATENT DOCUMENTS

| | | | | |
|---|---|---|---|---|
| DE | 3343883 A1 | 6/1984 | | G05F/1/56 |
| DE | 4206478 A1 | 9/1993 | | H02M/3/10 |
| EP | 0650250 A1 | 8/1994 | | H02M/3/156 |
| EP | 0883051 A1 | 6/1998 | | G05F/1/575 |
| EP | 1073187 A2 | 7/2000 | | H02M/3/156 |
| FR | 2610149 A1 | 7/1998 | | H02M/3/156 |

* cited by examiner

*Primary Examiner*—Rajnikant B. Patel
(74) *Attorney, Agent, or Firm*—Gary R. Stanford (57) ABSTRACT

A multiphase ripple voltage regulator generator employs a hysteretic comparator referenced to upper and lower voltage thresholds. The hysteretic comparator monitors a master ripple voltage waveform developed across a capacitor supplied with a current proportional to the difference between the output voltage and either the input voltage or ground. The output of the hysteretic comparator generates a master clock signal that is sequentially coupled to PWM latches, the states of which define the durations of respective components of the synthesized ripple voltage. A respective PWM latch has a first state initiated by a selected master clock signal and terminated by an associated phase voltage comparator that monitors a respective phase node voltage.

23 Claims, 5 Drawing Sheets

SYNCHRONIZATION OF MULTIPHASE SYNTHETIC RIPPLE VOLTAGE REGULATOR

CROSS-REFERENCE TO RELATED APPLICATION

The present application is a continuation-in-part of co-pending U.S. patent application, Ser. No. 10/236,787, filed Sep. 6, 2002 now U.S. Pat. No. 6,791,306, entitled: "Synthetic Ripple Regulator," by M. Walters et al (hereinafter referred to as the '787 patent application), assigned to the assignee of the present application and the disclosure of which is incorporated herein.

FIELD OF THE INVENTION

The present invention relates in general to power supply circuits and components therefor, and is particularly directed to an arrangement for synchronizing a plurality of synthetic ripple generators that generate artificial or synthesized ripple waveforms to control switching operations of a multiphase DC—DC converter.

BACKGROUND OF THE INVENTION

Figure 1:
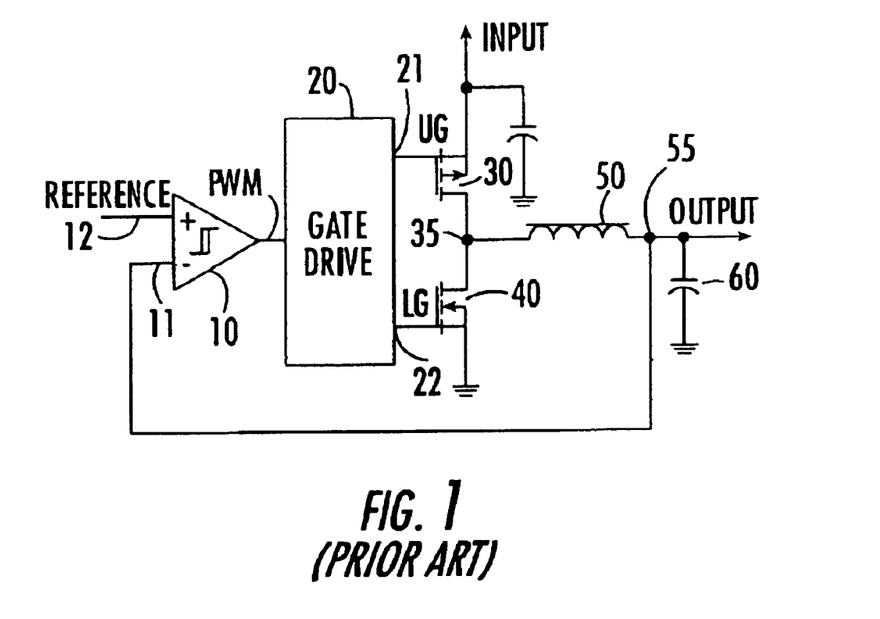
FIG. 1 diagrammatically illustrates the general architecture of a conventional ripple regulator-based DC—DC voltage converter.

As described in the background section of the above-referenced '787 patent application, electrical power for integrated circuits is typically supplied by one or more direct current (DC) power sources. In a number of applications the circuit may require plural regulated voltages that are different from the available supply voltage, which may be relatively low e.g., on the order of three volts or less, particularly where low current consumption is desirable, such as in portable, battery-powered devices. (This architecture may achieve a much high voltage difference in portable applications, for example an input voltage on the order of 4.5–25V and an output voltage Vo on the order of 0.5V–3.7V.) Moreover, in many applications the load current may vary over several orders of magnitude. To address these requirements it has been common practice to employ ripple generator-based converters, such as a hysteresis or 'bang-bang' converter of the type shown in FIG. 1.

Such a ripple regulator-based DC—DC voltage converter employs a relatively simple control mechanism and provides a fast response to a load transient. The switching frequency of the ripple voltage regulator is asynchronous, which is advantageous in applications where direct control of the switching frequency or the switching edges is desired. For this purpose, the ripple voltage regulator of FIG. 1 employs a hysteresis comparator 10, that switchably controls a gate drive circuit 20, respective output drive ports 22 and 23 of which are coupled to the control or gate drive inputs of a pair of electronic power switching devices, respectively shown as an upper P-MOSFET (or PFET) device 30 and a lower N-MOSFET (or NFET) device 40. These FET switching devices have their drain-source paths coupled in series between first and second reference voltages (Vdd and ground (GND)).

Figure 2:
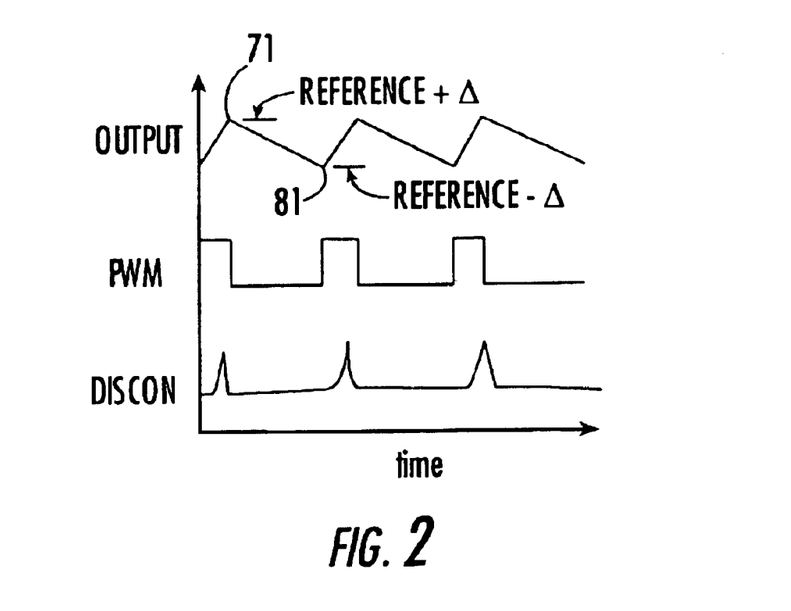
FIG. 2 is a timing diagram showing PWM and output voltage waveforms associated with the operation of the ripple regulator-based DC—DC voltage converter of FIG. 1.

The gate drive circuit 20 controllably switches or turns the two switching devices 30 and 40 on and off, in accordance with a pulse width modulation (PWM) switching waveform (such as that shown at PWM in the timing diagram of FIG. 2) supplied by comparator 10. The upper PFET device 30 is turned on and off by an upper gate switching signal UG applied by the gate driver 20 to the gate of the PFET device 20, and the lower NFET device 30 is turned on and off by a lower gate switching signal LG applied by the gate driver 20 to the gate of the NFET device 30.

A common or phase voltage node 35 between the two power FETs 30/40 is coupled through an inductor 50 to a capacitor 60, which is referenced to a prescribed potential (e.g., ground (GND)). The connection 55 between the inductor 50 and the capacitor 60 serves as an output node, from which an output voltage Vout (shown as triangular waveform Output in FIG. 2) is derived. In order to regulate the output voltage relative to a prescribed reference voltage, the output node 55 is coupled to a first, inverting (−) input 11 of the hysteresis comparator 10, a second, non-inverting (+) input 12 of which is coupled to receive a DC Reference voltage.

In such a hysteretic regulator, the output PWM signal waveform produced by hysteresis comparator 10 transitions to a first state (e.g., goes high) when the output voltage Vout at node 55 falls below the reference voltage Reference (minus the comparator's inherent hysteresis voltage $\Delta$). Conversely, the comparator's PWM output transitions to a second state (e.g., goes low) when the output voltage Vout exceeds the reference voltage plus the hysteresis voltage $\Delta$. The application of or increase in load will cause the output voltage (Vout) to decrease below the reference voltage, in response to which comparator 10 triggers the gate drive to turn on the upper switching device 30. Because the converter is asynchronous, the gate drive control signal does not wait for a synchronizing clock, as is common in most fixed frequency PWM control schemes.

Principal concerns with this type of ripple voltage regulator include large ripple voltage, DC voltage accuracy, and switching frequency. Since the hysteretic comparator 10 directly sets the magnitude of the ripple voltage Vout, employing a smaller hysteresis $\Delta$ will reduce the power conversion efficiency, as switching frequency increases with smaller hysteresis. In order to control the DC output voltage, which is a function of the ripple wave shape, the peak 71 and the valley 72 of the output ripple voltage (Output, shown in FIG. 2) is regulated. For the triangular wave shape shown, the DC value of the output voltage is a function of the PWM duty factor. The output voltage wave shape also changes at light loads, when current through the inductor 50 becomes discontinuous, producing relatively short 'spikes' between which are relatively long periods of low voltage, as shown by the DISCON waveshape in FIG. 2. Since the ripple voltage wave shape varies with input line and load conditions, maintaining tight DC regulation is difficult.

In addition, improvements in capacitor technology will change the ripple wave shape. In particular, the current state of ceramic capacitor technology has enabled the equivalent series resistance or ESR (which produces the piecewise linear or triangular wave shape of the output voltage waveform shown in FIG. 2) of ceramic capacitors to be reduced to very low values. At very low values of ESR, however, the output voltage's ripple shape changes from triangular to a non-linear shape (e.g., parabolic and sinusoidal). This causes the output voltage to overshoot the hysteretic threshold, and results in higher peak-to-peak ripple. As a result, the very improvements that were intended to lower the output voltage ripple in DC—DC converters can actually cause increased ripple when used in a ripple voltage regulator.

Figure 3:
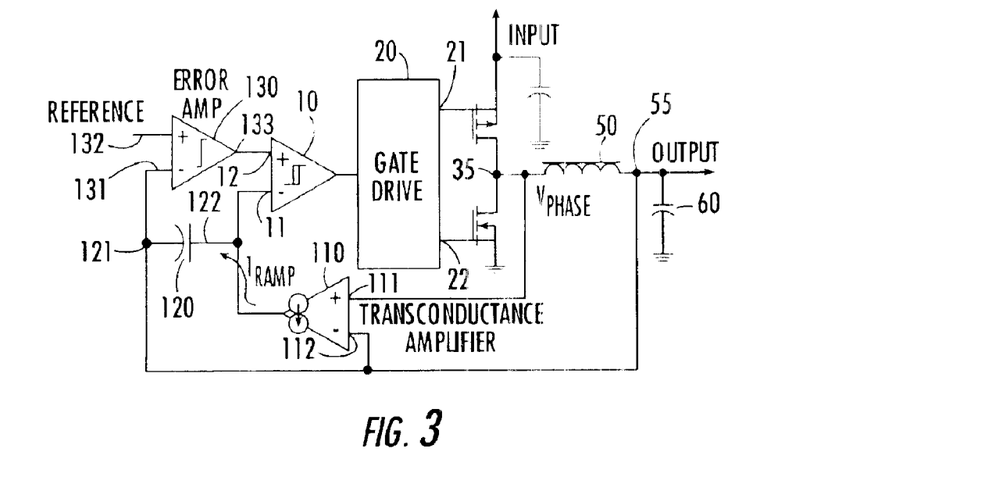
FIG. 3 diagrammatically illustrates an implementation of the synthetic ripple voltage regulator in accordance with the invention disclosed in the '787 application.

In accordance with the invention disclosed in the '787 application, shortcomings of conventional ripple voltage regulators, including those described above, are effectively obviated by the synthetic ripple voltage regulator shown in FIG. 3. This synthetic ripple voltage regulator generates an auxiliary voltage waveform, that effectively replicates or mirrors the waveform ripple current through the output inductor 50, and uses this auxiliary voltage waveform to control toggling of the hysteretic comparator 10. Using such a reconstructed current for the purpose of ripple voltage regulation results in low output ripple and simplified compensation.

More particularly, the synthetic ripple voltage regulator of FIG. 3 employs a transconductance amplifier 110, the output of which is coupled to a 'ripple voltage' capacitor 120. The transconductance amplifier 110 produces an output current $I_{RAMP}$ proportional to the voltage across inductor 50, which is interconnected between a node 35 common with the upper and lower MOSFETs (respective gate drives 21 and 22 for which are produced by a gate drive circuit 20), and an output node 55. The ripple voltage capacitor 120 transforms this output current ramp into an inductor current-representative voltage having the desired waveform shape. A benefit of synthesizing the ripple waveform based on inductor current is the inherent feed-forward characteristic. For a step input voltage change, the current $I_{RAMP}$ produced by the transconductance amplifier 110 will change proportionally to modify the conduction interval of the power switching devices.

For this purpose, transconductance amplifier 110 has a first, non-inverting (+) input 111 coupled to the phase node 35 and a second, inverting (−) input 112 coupled to output voltage node 55 at the other end of inductor 50, so that the transconductance amplifier 110 effectively 'sees' the voltage across inductor 50. The output voltage node 55 is further coupled to a first terminal 121 of capacitor 120 and to the inverting (−) input 141 of an error amplifier 130 inserted upstream of the hysteresis comparator 10. Error amplifier 130 serves to increase the DC regulation accuracy, providing high DC gain to reduce errors due to ripple wave shape, various offsets, and other errors. Error amplifier 130 has a second, non-inverting (+) input 132 thereof coupled to receive the voltage Reference, while its output 133 is coupled to the non-inverting (+) input 12 of hysteresis comparator 10. In the configuration of FIG. 3, the output of the error amplifier 130 follows the load current. The transconductance amplifier 110 has its output 113 coupled to a second terminal 122 of the capacitor 120 and to inverting (−) input 11 of the hysteresis comparator 10.

Figure 4:
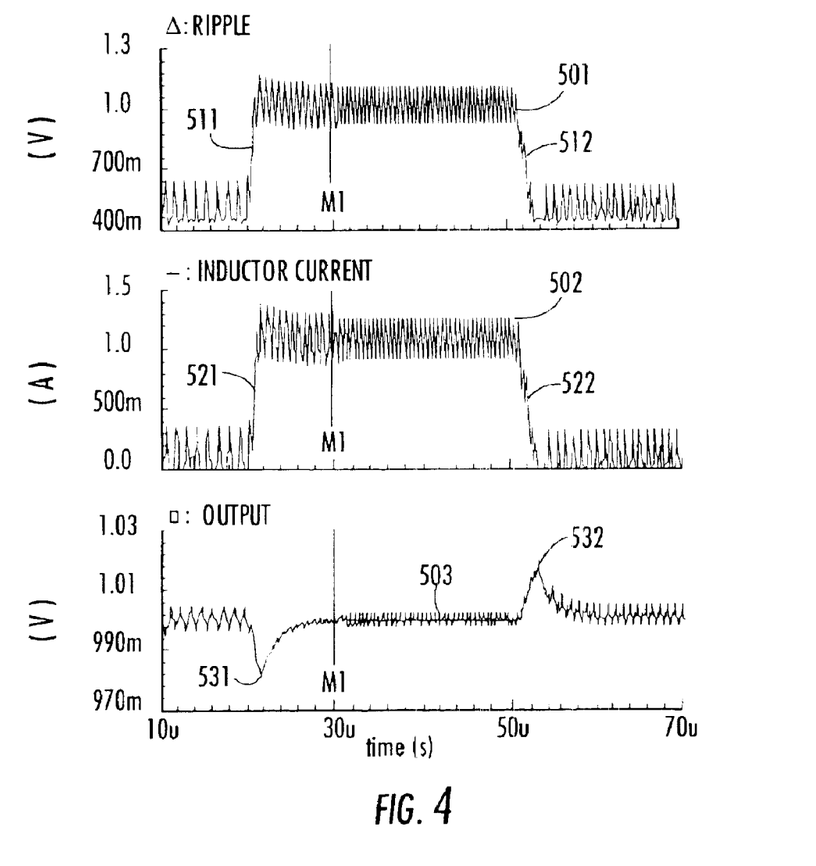
FIG. 4 is a timing diagram showing waveforms associated with the operation of the synthetic ripple voltage regulator of FIG. 3.

The operation of the synthetic ripple voltage regulator of FIG. 3 may be understood with reference to the set of waveform timing diagrams of FIG. 4. As a non-limiting example, the regulator voltage may be set at a value of Reference=1 VDC and the hysteresis comparator 10 may trip with +/−100 mV of hysteresis. The inductance of inductor 50 is 1 $\mu$H and the output capacitance is 10 $\mu$F. The line M1 (at the 30 $\mu$sec time mark) in FIG. 4 represents a change in input voltage from a value on the order of 3.6 VDC prior to M1 to a value on the order of 4.2 VDC at M1 and thereafter.

The upper waveform 501 corresponds to the ripple voltage generated across the ripple voltage capacitor 120; the middle waveform 502 is the current through inductor 50, and the lower waveform 503 is the output voltage at node 55. The similarity of the respective ripple and inductor current waveforms 501 and 502 is readily apparent, as shown by respective step transitions 511/521 and 512/522 therein, at t=20 $\mu$s and t=50 $\mu$s. As shown by waveform 502, the converter is initially supplying an inductor current on the order 100 mA for an input supply voltage of 3.6 VDC. This inductor current is discontinuous and the switching frequency has a relatively stable value on the order of 900 kHz.

At the transient 521 (t=20 $\mu$s) in waveform 502, there is a stepwise (×10) increase in the load current from 100 mA to a value on the order of 1 A, and the switching frequency increases to a frequency on the order of 1.5 MHz. From the output voltage waveform 503, it can be seen that the amount of ripple 531 occurring at this transient is relatively small (on the order of only +/−3 mV, which is well below that (+/−100 mV) of the prior art regulator of FIG. 1, during discontinuous operation, where load current=100 mA, and then drops to +/−1.5 mV).

At the M1 or t=30 $\mu$s time mark, there is a stepwise increase in input voltage from 3.6 VDC to 4.2 VDC, and the switching frequency increases to almost 2.3 MHz, yet the levels of each of waveforms 501, 502 and 503 remain stable. Subsequently, at t=50 $\mu$s, there is a step transient 512 in the inductor/load current waveform 501, which drops back down from 1 A to 100 mA, and the switching frequency settles to a value on the order of 1.3 MHz. As can be seen in the output voltage waveform 503, like the ripple 531 occurring at the t=20 $\mu$s transient, the amount of ripple 532 for this further transient is also relatively small (on the order of only +−3 mV and dropping to +/−1.5 mV), so that the output voltage may be effectively regulated at a value on the order of the voltage Reference of 1 VDC.

SUMMARY OF THE INVENTION

In accordance with the present invention, the functionality of the transconductance amplifier and hysteretic comparator architecture disclosed in the '787 application is applied to a multiphase DC—DC voltage generator, to realize a new and improved circuit arrangement for synchronizing a plurality of synthetic ripple voltage generators, that generate artificial or synthesized ripple voltage waveforms for controlling switching operations of a multiphase DC—DC voltage converter. The synthetic ripple voltage regulator of the invention has a variable frequency that is a function of the input voltage, output voltage and load.

For this purpose, the invention comprises a master hysteretic comparator that is referenced to upper and lower voltage thresholds. The master hysteretic comparator monitors a master ripple voltage waveform that is produced across a capacitor by a current proportional to the difference between the output voltage and either the input voltage or a reference voltage (ground). The proportionality current is produced by a transconductance amplifier pair. The output of the master hysteretic comparator serves as a master clock signal that is sequentially coupled to PWM latches, the states of which define the durations of respective components of the synthesized ripple voltage. A respective PWM latch has a first state thereof initiated by a selected master clock signal produced by the hysteretic comparator and terminated by an associated comparator that monitors a respective phase node voltage.

As noted above, the synthetic ripple voltage regulator of the invention has a variable frequency that is a function of the input voltage, output voltage and load. In accordance with an alternative approach, a comparator and one-shot are used to generated a master clock signal having a fixed, steady-state frequency, with the difference between Vlower and Vupper being set proportional to the output voltage Vo. In an alternative methodology for producing produce the output signal PWM1, the output signal from the sequence logic causes the output port signal PWM1 to change state (e.g., go high), and a switch is turned on. The ripple capacitor voltage across a ripple capacitor is thereby increased by a charge current proportional to (Vin–Vo). The phase1 ripple voltage crosses the upper voltage threshold Vupper, and a comparator resets the output flip-flop from which PWM1 is produced. This causes the PWM1 output to change state (go low). During the interval between opposite peaks in the phase1 ripple capacitor voltage, the voltage across the capacitor decreases by a discharge current proportional to Vo.

DETAILED DESCRIPTION

Before describing a non-limiting, but preferred embodiment of the multiphase synthetic ripple voltage regulator synchronization scheme of the present invention, it should be observed that the invention resides primarily in an arrangement of conventional circuit components, and the manner in which they may be incorporated into a multiphase hysteretic controller of the type described above. It is to be understood that the invention may be embodied in a variety of other implementations, and should not be construed as being limited to only the embodiment shown and described herein. Rather, the implementation example shown and described here is intended to supply only those specifics that are pertinent to the present invention, so as not to obscure the disclosure with details that are readily apparent to one skilled in the art having the benefit of present description. Throughout the text and drawings like numbers refer to like parts.

Figure 5:
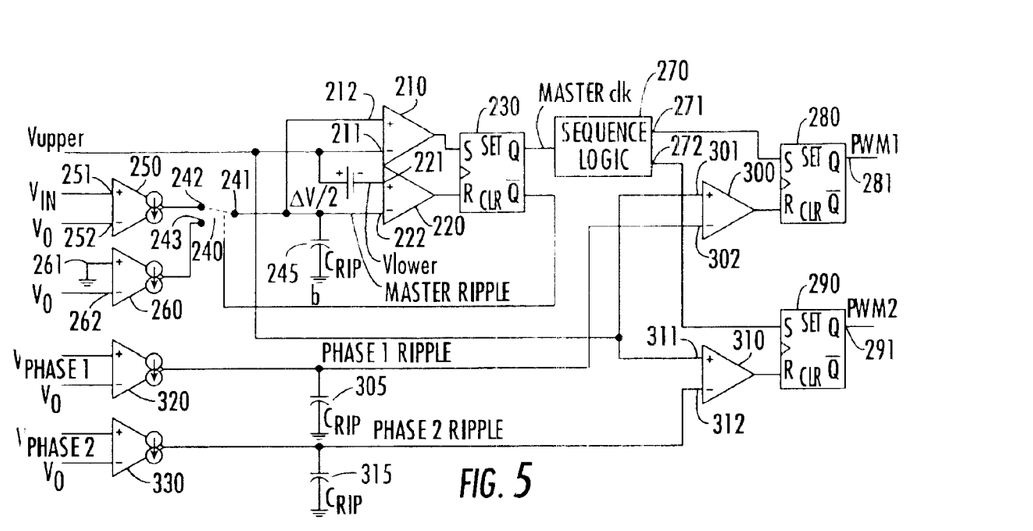
FIG. 5 diagrammatically illustrates a multiphase synthetic ripple voltage regulator in accordance with the present invention.

Attention is now directed to FIG. 5, which diagrammatically illustrates the general architecture of a multiphase synthetic ripple voltage regulator in accordance the present invention for a two phase regulator. It will be readily appreciated from the description to follow that the architecture and functionality of the present invention may be readily expanded to additional phases as desired. A two phase implementation has been shown as a reduced complexity multiphase example for purposes of reducing the complexity of the drawings and their attendant description.

The multiphase synthetic ripple voltage regulator of FIG. 5 is shown as comprising a 'master' hysteretic comparator 200 formed of upper and lower threshold comparators 210 and 220, outputs of which are respectively coupled to the SET and RESET inputs of a SET/RESET flip-flop 230. A first, inverting (–) input 211 of comparator 210 is coupled to receive an upper threshold voltage Vupper, while first, non-inverting (+) input 221 of comparator 220 is coupled to receive a lower threshold voltage Vlower, that is some prescribed offset ΔV/2 lower than the upper threshold voltage Vupper. Each of the second, non-inverting input 212 of comparator 210 and the second, inverting (–) input 222 of comparator 220 are coupled to a common terminal 241 of a controlled switch 240, and also to a capacitor 245, which is referenced to ground. Switch 240 is controlled by the Q output of flip-flop 230.

A first input terminal 242 of switch 240 is coupled to the output of a transconductance amplifier 250, while a second input terminal 243 of switch 240 is coupled to the output of a transconductance amplifier 260. Transconductance amplifier 250 has a first, non-inverting (+) input 251 coupled to receive the input voltage Vin to the regulator, while a second, inverting (–) input 252 thereof is coupled to receive the output voltage Vo of the regulator (namely, the voltage at output node 55 of the circuits of FIGS. 1 and 3, for example). Transconductance amplifier 250 produces an output current proportional to the difference between its inputs, namely proportional to Vin–Vo. Transconductance amplifier 260 has a first, non-inverting (+) input 261 coupled to ground, while a second input 262 thereof is coupled to receive the output voltage Vo. Transconductance amplifier 250 produces an output current proportional to the difference between its inputs, namely proportional to 0–Vo.

The QBAR output of flip-flop 230 is coupled to a sequence logic circuit 270. Sequence logic circuit 270, which may be implemented as a counter, has N outputs corresponding to the number of phases being generated. In the present two phase example, sequence logic circuit 270 has a first output 271 coupled to the SET input of a SET/RESET flip-flop 280 and a second output 272 coupled to the SET input of SET/RESET flip-flop 290. For this purpose, sequence logic 270 may be implemented as a flip-flop for a two-phase application, or a shift register in more than a two-phase application. The RESET input of flip-flop 280 is coupled to the output of a comparator 300, while the RESET input of flip-flop 290 is coupled to the output of a comparator 310.

Comparators 300 and 310 have first, non-inverting (+) inputs 301 and 311 respectively coupled to receive the upper threshold voltage Vupper. The inverting (−) input 302 of comparator 300 is coupled to receive a phase 1 ripple voltage waveform that is developed across a capacitor 305, as a result of current supplied to capacitor 305 by a phase 1 transconductance amplifier 320. The inverting (−) input 312 of comparator 310 is coupled to receive a phase 2 ripple voltage that is developed across a capacitor 315, as a result of current supplied to capacitor 315 by a phase 2 transconductance amplifier 330.

Phase 1 transconductance amplifier 320 has a first, non-inverting (+) input 321 coupled to receive a phase 1 voltage Vphase1 and a second, inverting (−) input 322 coupled to receive the output voltage Vo. The phase 1 voltage Vphase1 corresponds to the voltage at node 35 of the converter circuit associated with a first phase output voltage, and controllably gated in accordance with the PWM1 waveform output of output flip-flop 280. Thus, transconductance amplifier 320 generates a voltage Phase1 ripple proportional to Vphase1−Vo. Similarly, phase 2 transconductance amplifier 330 has a first, non-inverting (+) input 331 coupled to receive a phase 2 voltage Vphase2, and a second, inverting (−) input 332 coupled to receive the output voltage Vo. The phase 2 voltage Vphase2 corresponds to the voltage at node 35 of the converter circuit associated with a second phase output voltage, and controllably gated in accordance with the PWM2 output of output flip-flop 290. Thus, transconductance amplifier 330 generates a voltage Phase2 ripple proportional to Vphase2−Vo.

Figure 6:
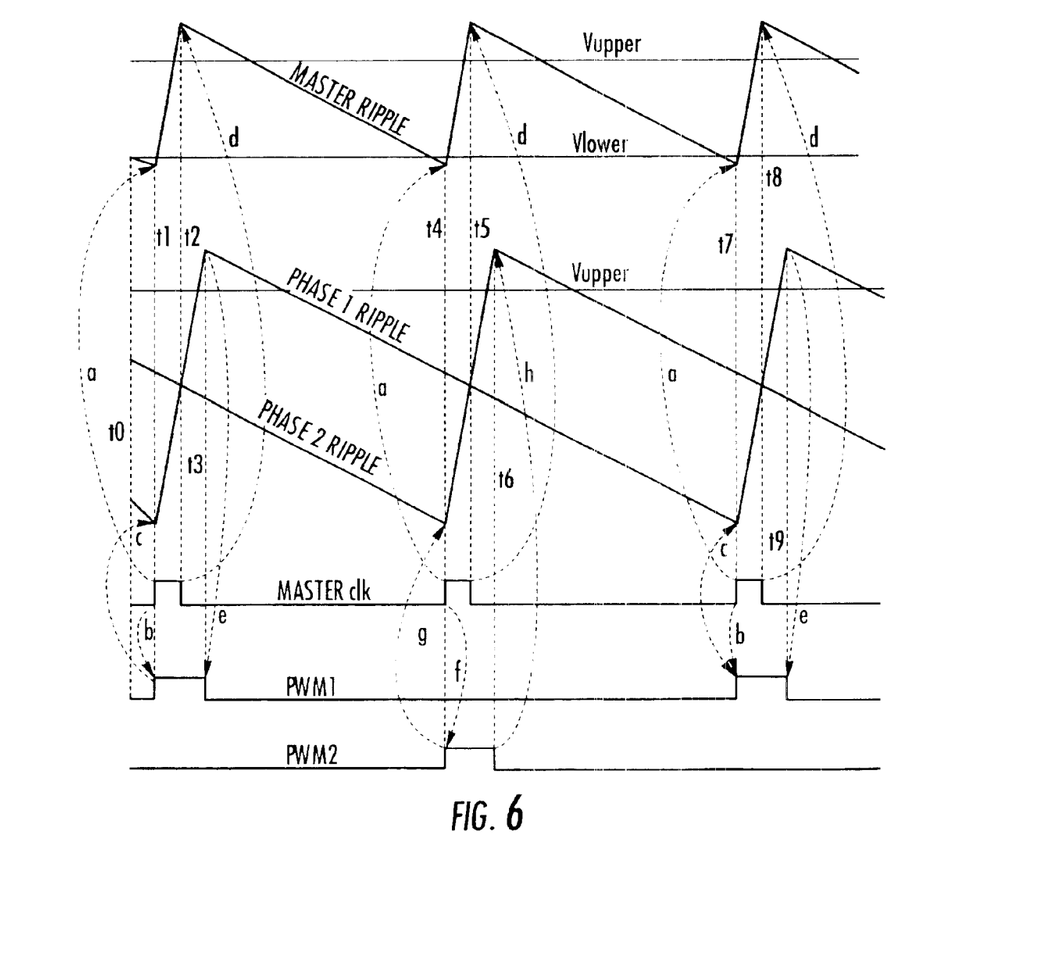
FIG. 6 contains a set of timing diagrams associated with the operation of the multiphase synthetic ripple voltage regulator of FIG. 5.

Operation of the multi-phase synthetic ripple voltage regulator of the present invention may be readily understood with reference to the timing diagrams of FIG. 6. The uppermost portion of FIG. 6 shows a master ripple waveform 400, which exhibits a sawtooth behavior with respect to the upper and lower thresholds Vupper and Vlower, respectively. The middle portion of FIG. 6 shows phase1 and phase2 ripple waveforms, which exhibit a sawtooth behavior with respect to the upper threshold Vupper. It is to be noted that the two instances of the Vupper threshold are in actuality at the same level. However, they have been separated in FIG. 6 in order to facilitate an illustration of the various ripple waveforms and, in particular, the times of occurrence of various events for those waveforms. This avoids a superimposed cluttering of the phase 1 and phase 2 waveforms by the master ripple waveform. Finally, the lowermost portion of FIG. 6 shows a master clock (clk) signal that is produced at the QBAR output of flip-flop 230, and the PWM1 and PWM2 waveforms produced at the Q outputs of output flip-flops 280 and 290, respectively.

Considering initially, the master ripple and the master clock waveforms, at time t0, the master ripple waveform is shown as decreasing and crossing the lower threshold Vlower. During the interval leading up to t0, the common terminal 241 of switch 240 is connected to input terminal 243, so that a current proportional to ground (0V)−Vo, or simply −Vo is applied to capacitor 245. Namely, the voltage V245 across capacitor, which is the master ripple voltage, is decreasing during this interval. When (at time t0) this decreasing voltage crosses the lower threshold Vlower which is applied to the input 221 of comparator 220, comparator 220 is tripped and resets flip-flop 230. The latency between the actual crossing of the lower threshold Vlower and time t1 when flip-flop 230 resets (its QBAR output goes high) is due to second order circuit effects. When the QBAR output of flip-flop 230 goes high, the master clock (Master clk) goes high, and sequence logic 270 couples this output to the set input of the PWM1 output flip-flop 280, so that its Q output 281 (which represents the PWM1 waveform) goes high at time t1.

The change in state in the QBAR output of flip-flop 230 switches the connection of switch 240 to input 242, so that the output of transconductance amplifier 250 is monitored by the hysteretic comparator circuitry. During a time interval beginning with t1, transconductance amplifier 250 produces an output current that is proportional to the difference between its inputs, namely proportional to Vin−Vo. This current is applied to capacitor 245, so that as capacitor 245 is charged, its voltage (Master ripple) increases, as shown between time t1 and t2. Eventually, the increase in the master ripple voltage will exceed the upper threshold Vupper, causing comparator 210 to trip and set flip-flop 230. It may be again noted that due to second order latency effects, the time t2 associated with the resetting of flip-flop 230 is slightly delayed relative to the actual instant at which the master ripple voltage crosses the upper threshold voltage Vupper.

With flip-flop 230 now set, its QBAR output goes low at time t2, and remains there until it is again reset by comparator 220, as described above. During the interval subsequent to time t2, with flip-flop 230 being set, switch 240 connects input 243 to its common terminal 241, so that a negative current proportional to −Vo is again supplied to capacitor 245 by transconductance amplifier 260, causing the master ripple voltage across capacitor 245 to decrease, as shown by the negative slope of the master ripple waveform. Eventually, at time t4, the master ripple waveform again crosses the lower threshold Vlower, so that comparator 220 is again tripped and resets flip-flop 230. When the QBAR output of flip-flop 230 goes high, sequence logic 270 couples this output via output port 272 to the set input of the PWM2 output flip-flop 290, so that its Q output 291 (the PWM2 waveform) goes high at time t4.

The reset state of flip-flop 230 switches the connection of the common terminal 241 of switch 240 to its input 242, so that the output of transconductance amplifier 250 is now monitored by the hysteretic comparator circuitry. During a new time interval beginning with time t4, transconductance amplifier 250 produces an output current that is proportional to the difference between its inputs, namely proportional to Vin−Vo. Again, as described above, this current is applied to capacitor 245, so that capacitor 245 is charged causing its voltage Master ripple to increase, as shown in the interval between times t4 and t5. Eventually, this increase in Master ripple voltage will exceed the upper threshold Vupper, causing comparator 210 to trip, setting flip-flop 230.

With flip-flop 230 again set, its QBAR output goes low at time t5, and remains there until it is once again reset by comparator 220, as described above. During the interval subsequent to time t5, with flip-flop 230 set, switch 240 reconnects input 243 to its common terminal 241, so that a negative current is again supplied to capacitor 245 by the transconductance amplifier 260, causing the master ripple voltage across capacitor 245 to decrease, as shown by the negative slope of the master ripple waveform during the time interval t5–t7. Eventually, at time t7, the master ripple waveform crosses the lower threshold Vlower, so that comparator 220 is again tripped and resets flip-flop 230. When the QBAR output of flip-flop 230 again goes high, sequence logic 270 recouples this output via output port 271 back to the set input of the PWM1 output flip-flop 280, so that its Q output 281 (and thereby the PWM1 waveform) goes high at time t7. This above process is repeated for subsequent cycles, as shown.

Although the master ripple generator portion of the circuit directly controls the generation of the master clock and the rising edges of the PWM1 and PWM2 waveforms, its does not directly control the falling edges of the PWM1 and PWM2 waveforms. The falling edges are controlled by the phase1 and phase 2 ripple waveforms, as will described below. It should be noted, however, that the master ripple generator serves to control the frequency of the master clock and thereby the ripple voltages, since its generation is dependent upon the input and output voltages. Increasing the input voltage Vin increases the magnitude of the current (Vin−Vo) supplied by transconductance amplifier 250 to capacitor 245, and thereby reduces the time required for the master ripple voltage across capacitor 245 to reach the upper threshold voltage Vupper. Conversely, decreasing the output voltage Vo not only increases the magnitude of the current (Vin−Vo) supplied by transconductance amplifier 250, but increases the magnitude of the negative current supplied by transconductance amplifier 260, the latter being effective to reduce the time required for the master ripple voltage across capacitor 245 to reach the lower threshold voltage Vlower.

As pointed out above, transconductance amplifiers 320 and 330 produce output currents Phase1 ripple and Phase2 ripple that are respectively proportional to Vphase1−Vo and Vphase2−Vo, with the voltages Vphase1 and Vphase2 corresponding to the voltages at nodes 35 of the converter circuits associated with respective phases of the multiphase DC—DC converter. Considering first the Phase1 ripple waveform, the phase1 ripple waveform is shown as decreasing and the waveform continues to decrease until the master ripple voltage crosses the lower threshold, at time t0, so that comparator 220 is tripped and resets flip-flop 230. As described above, due to second order latency effects, flip-flop 230 is reset at time t1, at which time sequence logic 270 drives the set input of the PWM1 output flip-flop 280, so that its Q output 281 and thereby the PWM1 waveform goes high. With the PWM1 waveform going high, the Vphase1 voltage at node 35 of its associated DC—DC converter is driven high, so that transconductance amplifier 320 begins to charge capacitor 305 with a current proportional to Vphase1−Vo, whereby the voltage across capacitor 305 increases, as shown by the positive slope portion of the phase1 ripple voltage beginning at time t1. Eventually, this increasing phase1 ripple voltage, which is applied to the inverting (−) input 302 of comparator 300 crosses the upper threshold voltage Vupper, which is applied to the non-inverting input 301 of comparator 300. When this happens, and taking into account second order latency effects, comparator 300 is tripped at time t3, and therefore drives the reset input of PWM1 output flip-flop 280. With flip-flop 280 being reset by comparator 300 at time t3, the Q output 281 of flip-flop 280 is now driven low, causing the PWM1 waveform to go low. The PWM1 waveform will remain low until flip-flop 280 is again set at time t7 as described above. During the interval from t3 to t7, the relatively low phase1 voltage derived from phase node 35 causes transconductance amplifier 320 to apply a negative current (on the order of −Vo) to capacitor 305, so that the phase1 ripple voltage waveform is continuously decreasing until the next cycle for PWM1.

The Phase2 ripple waveform operates in the same manner as the Phase1 waveform, described above, except that it is every other master clock cycle relative to the Phase1 waveform. Namely, just prior to time t4, the phase2 ripple waveform is decreasing and the phase2 ripple waveform continues to decrease until the master ripple voltage crosses the lower threshold, so that comparator 220 is tripped and resets flip-flop 230. As described above, due to second order latency effects, flip-flop 230 is reset at time t4, at which time sequence logic 270 drives the set input of the PWM2 output flip-flop 290, so that its Q output 291 and thereby the PWM2 waveform goes high. With the PWM2 waveform going high, the Vphase2 voltage at node 35 of its associated DC—DC converter is driven high, so that transconductance amplifier 330 begins to charge capacitor 315 with a current proportional to Vphase2−Vo, which increases the voltage across capacitor 315, as shown by the positive slope portion of the phase2 ripple voltage beginning at time t4. Eventually, this increasing phase2 ripple voltage, which is applied to the inverting (−) input 312 of comparator 310 crosses the upper threshold voltage Vupper, which is applied to the non-inverting input 311 of comparator 310. When this happens, and taking into account second order latency effects, comparator 310 is tripped at time t5, and therefore drives the reset input of PWM2 output flip-flop 290. With flip-flop 290 being reset by comparator 310 at time t5, the Q output 291 of flip-flop 290 is now driven low, causing the PWM2 waveform to go low. The PWM2 waveform will remain low until flip-flop 290 is eventually again set by the next alternating cycle of the master clock, subsequent to that occurring between t7 and t8. During the next interval beginning with time t6, the relatively low phase2 voltage derived from the phase node 35 causes transconductance amplifier 330 to apply a negative current (on the order of −Vo) to capacitor 315, so that the phase2 ripple voltage waveform is continuously decreasing until the next cycle for PWM2.

Figure 7:
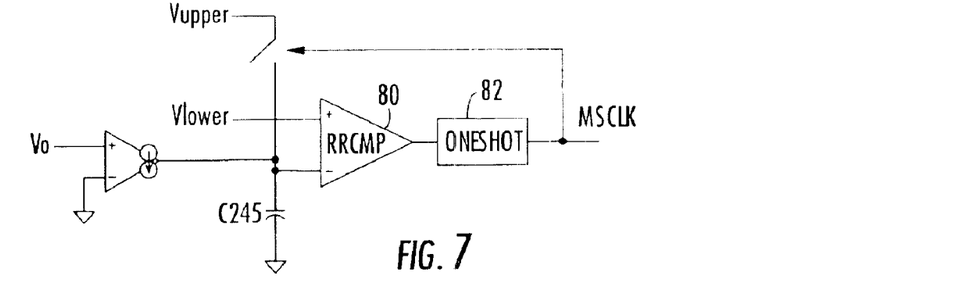
FIG. 7 shows the use of a single comparator and one-shot to generate a master clock signal.
Figure 8:
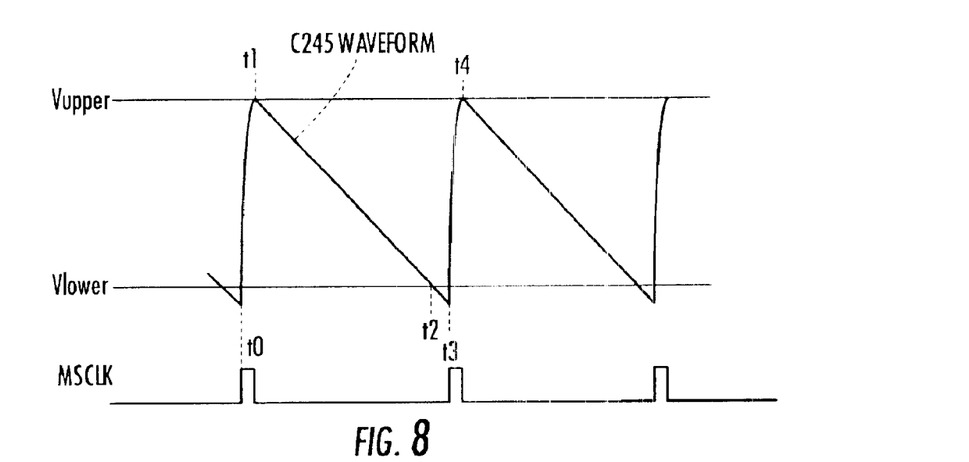
FIG. 8 is a timing diagram associated with the operation of FIG. 7.

In accordance with a first alternative approach, the master ripple waveform produced across capacitor 245 may be created by a discharge and reset technique, using a single comparator as shown in FIG. 7, and the associated timing diagram of FIG. 8. At a time to, capacitor C245 is discharged by a current proportional to Vo. When the voltage across capacitor C245 drops below or crosses the threshold Vlower at t1, the output of comparator 80 and a one-shot 82, shown as MSLCK, close the switch and reset the voltage across capacitor C245 to the value of the upper voltage rail Vupper during the interval from t3 to t4. It should also be noted that a pair of master ripple capacitors may be employed in the place of the signal master capacitor C245. In this case the two capacitors alternately discharge from Vupper to Vlower, which serves to eliminate the reset interval (from t3 to t4).

Figure 9:
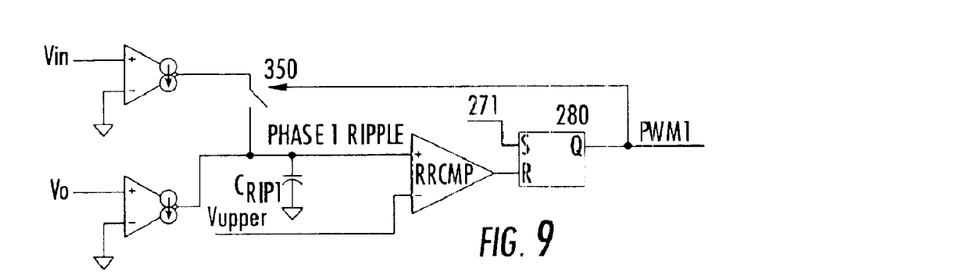
FIG. 9 illustrates an alternative circuit arrangement for producing an output signal PWM1.
Figure 10:
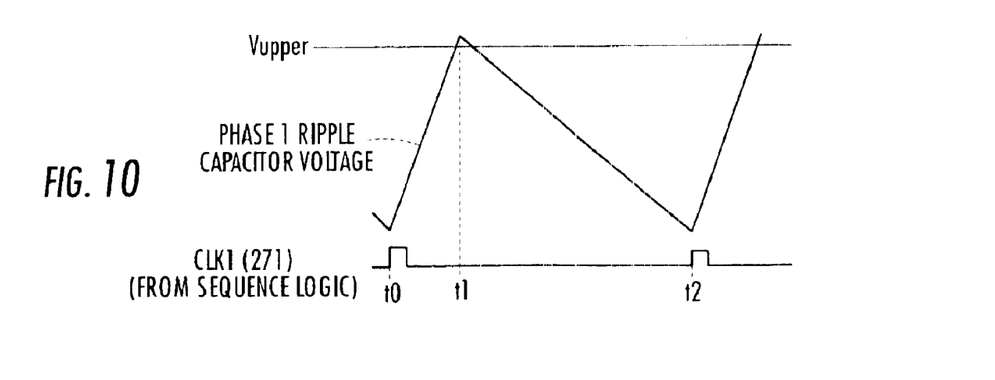
FIG. 10 is a timing diagram associated with the operation of FIG. 8.

FIGS. 9 and 10 diagrammatically illustrate an alternative technique to produce the output signal PWM1. This same circuit may be applied to any of the other phases in a multiphase application. At time t0 in the timing diagram of FIG. 9, the signal CLK1 (271) from the sequence logic causes the output port (PWM1) of flip-flop 280 to go high, and a switch 350 is turned on. The ripple capacitor voltage across capacitor $C_{RIP}$ increases by a charge current that is proportional to (Vin−Vo). At time t1, the phase1 ripple voltage crosses the upper voltage threshold Vupper, and the comparator RRCMP resets flip-flop 280, causing the PWM1 output to change state (go low). During the interval from t1–t2, the voltage across capacitor $C_{RIP}$ decreases by a discharge current proportional to Vo.

A beneficial feature of the present invention, particularly in connection with multiphase systems, is the fact that it varies the converter's switching frequency in response to load changes, something which the prior art does not do. In contrast, the prior art hysteretic converter of FIG. 1, described above, actually slows down the switching frequency during a load step (increase). This load step causes a depressed output voltage, which has the effect of turning on the high side or upper FET 30, and leaves that FET on, until the output voltage at node 55 increases to the upper hysteretic set point, shown at 71 in FIG. 2. This means that such a control method is problematic in a multiphase system, where a single converter channel must pick up the full load current unit it can drive the output voltage above the upper hysteretic set point. As a consequence, a full load transient applied to a multiphase converter (such as a three-phase converter) results in one power channel having to deliver three times its steady state power.

Figure 11:
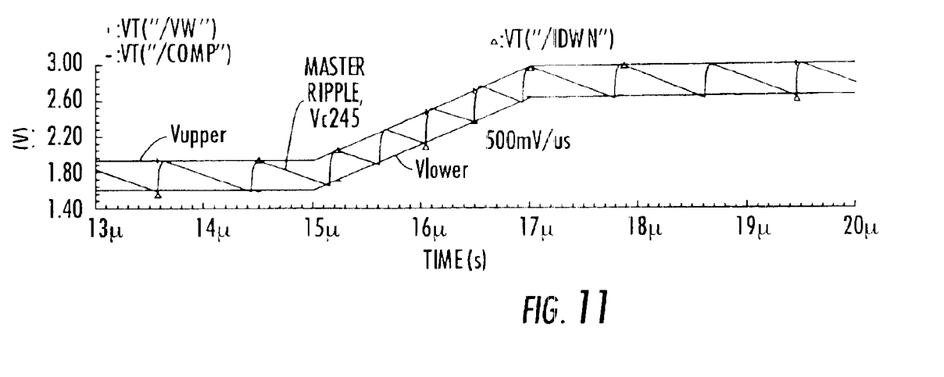
FIG. 11 is a timing diagram of upper and lower voltages associated with a load step.
Figure 12:
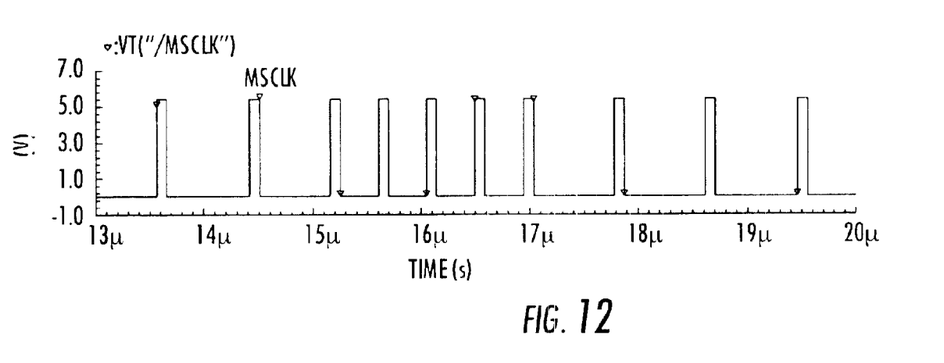
FIG. 12 shows a master clock pulse train associated with the transient increase of FIG. 11.
Figure 13:
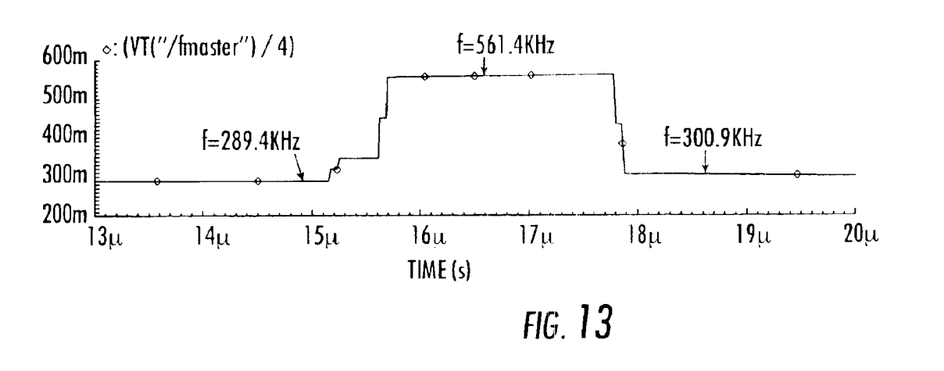
FIG. 13 graphically illustrates the change in frequency between a first relatively steady state, followed by a transition to a higher frequency and then a return to a further steady state frequency.

In accordance with the present invention, this problem is obviated by increasing the converter's switching frequency in response to a load step. This may be understood with reference to the block diagrams of FIGS. 3 and 5, described above, and the timing diagrams of FIGS. 11, 12 and 13. In particular, for a load step (increase), the voltage at the output node 55 will initially decrease, which is fed back to input 131 of the error amplifier 130. This decrease in the voltage at error amplifier 131 creates a larger differential across the error amplifier input and therefore a higher Vupper value produced at its output 133. This transitional increase in the value of Vupper applied to input 211 of amplifier 210 in FIG. 5 (and that of its associated voltage value Vlower applied to the input 221 of amplifier 220) is shown in FIG. 11. As can be seen therein, the master ripple will now encounter the Vupper and Vlower references more frequently, so that the Q output of flip-flop 230 will produce a master clock more frequently, as shown in FIG. 12. FIG. 13 graphically illustrates the change in frequency between a first relatively steady state having a frequency on the order of 289 KHz, followed by a transition (during the transient state) to a frequency on the order of 560 KHz which, in turn, is followed by a further steady state frequency on the order of 300 KHz.

It may be noted that the master clock signal initiates the PWM pulse which turns on the upper FET of the next successive power channel of the multiphase system, with the next power channel being selected by the sequence logic 270. Increasing the switching frequency means each successive power channel will pick up the load sooner than it does during steady state, so that all of the power channels participate in picking up a power of the transient load current.

An additional advantage of this method results for transient load steps that are less than full load. This may be contrasted with having to synchronize all of the power channels to turn-on the upper FET in each power channel in response to a load transient. With a less than full load transient, the resulting voltage is likely to overshoot the target regulation voltage. The present invention provides a relative smooth response to any magnitude transient.

As will be appreciated from the foregoing description, by applying functionality of the transconductance amplifier and hysteretic comparator architecture disclosed in the above-referenced '787 application to a multiphase DC—DC voltage generator, the present invention is able to realize a new and improved circuit arrangement for synchronizing a plurality of synthetic ripple voltage generators, that generate artificial or synthesized ripple voltage waveforms for controlling switching operations of a multiphase DC—DC voltage converter.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. For use with a multiphase DC—DC voltage converter having a controller which generates a plurality of pulse width modulation (PWM) switching signals that switchably control operation of associated switching circuits containing first and second electronic power switching devices coupled between respective power supply terminals, and having phase nodes thereof coupled through respective inductors to regulated voltage output voltage terminals, a method of controlling generation of said PWM switching signals comprising the steps of:

(a) generating a master clock waveform;
   (b) generating auxiliary voltage waveforms that effectively replicate ripple current waveforms in accordance with phase node voltages; and
   (c) controlling the generation of said PWM switching signals in accordance with said master clock waveform and respective ones of said auxiliary voltage waveforms.

2. The method according to claim 1, wherein step (a) comprises coupling input and output voltages to a hysteretic comparator which controls the generation of said master clock signal.

3. The method according to claim 1, wherein step (b) comprises coupling phase node voltages to respective transconductance amplifier circuits, outputs of which provide currents proportional to said phase node voltages, and supplying said currents to respective capacitors, to produce said auxiliary voltage waveforms.

4. The method according to claim 2, wherein said hysteretic comparator is operative to generate a first portion of said master clock waveform in response to a difference between said input and output voltages reaching a first prescribed threshold, and to generate a second portion of said master clock waveform in response to a difference between said output voltage and a reference voltage reaching a second prescribed threshold.

5. The method according to claim 4, wherein step (c) comprises controlling the generation of a first portion of a respective PWM switching signal in accordance with said first portion of said master clock waveform and controlling the generation of a second portion of said respective PWM switching signal in accordance with a respective one of said auxiliary voltage waveforms.

6. In a multiphase DC—DC voltage converter having a controller, which generates a plurality of pulse width modulation (PWM) switching signals that switchably control operation of respective switching circuits containing first and second electronic power switching devices coupled between respective power supply terminals, and having phase nodes thereof coupled through inductors to multiphase regulated voltage output voltage terminals, the improvement comprising:
- a master clock waveform generator;
- an auxiliary voltage waveform generator which is operative to generate auxiliary voltage waveforms that effectively replicate ripple current waveforms through said inductors; and
- a control circuit that is operative to control the generation of said PWM switching signals in accordance with said master clock waveform and respective ones of said auxiliary voltage waveforms.

7. The improvement according to claim 6, wherein said master clock generator comprises a hysteretic comparator that controls the generation of said master clock signal in accordance with input and output voltages of said DC—DC converter.

8. The improvement according to claim 7, wherein said auxiliary voltage waveform generator is operative to generate said auxiliary voltage waveforms to effectively replicate ripple current waveforms through said inductors by monitoring phase node voltages.

9. The improvement according to claim 8, wherein said control circuit includes transconductance amplifier circuits that are operative to monitor phase node voltages, with outputs of said transconductance amplifier circuits supplying inductor voltage-representative currents proportional to phase node voltages to associated capacitors, to produce said auxiliary voltage waveforms.

10. The improvement according to claim 7, wherein said hysteretic comparator is operative to generate a first portion of said master clock waveform in response to a difference between said input and output voltages reaching a first prescribed threshold, and to generate a second portion of said master clock waveform in response to a difference between said output voltage and a reference voltage reaching a second prescribed threshold.

11. The improvement according to claim 10, wherein said control circuit is operative to control generation of a first portion of a respective PWM switching signal in accordance with said first portion of said master clock waveform and to control the generation of a second portion of said respective PWM switching signal in accordance with a respective one of said auxiliary voltage waveforms.

12. A multiphase synthetic ripple voltage regulator for a multiphase DC—DC converter, said multiphase synthetic regulator generating a plurality of pulse width modulation (PWM) switching signals that switchably control operation of respective switching circuits containing first and second electronic power switching devices coupled between respective power supply terminals, and having phase nodes thereof coupled through inductors to multiphase regulated voltage output voltage terminals, said multiphase synthetic ripple voltage regulator comprising:
- a master ripple voltage generator which is operative to generate a master ripple voltage waveform in accordance with respective currents proportional to the difference between an output voltage of said regulator and one of an input voltage or ground;
- a hysteretic comparator which is operative to generate a master clock waveform in accordance with prescribed relationships between said master ripple voltage waveform and upper and lower voltage thresholds; and
- PWM latch circuits, states of which define durations of respective components of a multiphase synthesized ripple voltage, a respective PWM latch circuit being coupled to have a first state thereof initiated by a selected master clock signal, and a second state thereof defined by an associated phase voltage comparator that monitors a respective phase node voltage.

13. The multiphase synthetic ripple voltage regulator according to claim 12, further including auxiliary voltage waveform generators that are operative to generate auxiliary voltage waveforms that effectively replicate ripple current waveforms through said inductors by monitoring respective phase node voltages, wherein an output of a respective auxiliary voltage waveform generator is coupled to a respective phase voltage comparator.

14. The multiphase synthetic ripple voltage regulator according to claim 13, wherein said master ripple voltage generator includes transconductance amplifier circuits that are operative to monitor phase node voltages, with outputs of said transconductance amplifier circuits supplying inductor voltage-representative currents proportional to the voltage across said inductors to associated capacitors, to produce said auxiliary voltage waveforms.

15. The multiphase synthetic ripple voltage regulator according to claim 12, wherein said hysteretic comparator is operative to generate a first portion of said master clock waveform in response to a difference between said input and output voltages reaching a first prescribed threshold, and to generate a second portion of said master clock waveform in response to a difference between said output voltage and a reference voltage reaching a second prescribed threshold.

16. The multiphase synthetic ripple voltage regulator according to claim 15, wherein said PWM latch circuits are to control generation of a first portion of a respective PWM switching signal in accordance with said first portion of said master clock waveform and to control the generation of a second portion of said respective PWM switching signal in accordance with a respective one of said auxiliary voltage waveforms.

17. The multiphase synthetic ripple voltage regulator according to claim 12, wherein said master ripple voltage generator which is operative to generate a first portion of said master ripple voltage waveform in accordance a first current proportional to the difference between said input and output voltages of said regulator, and to generate a second portion of said master ripple voltage waveform in accordance with a second current proportional to the difference between ground and said output voltage.

18. A multiphase synthetic ripple voltage regulator for a multiphase DC—DC voltage converter, said multiphase synthetic voltage regulator generating a plurality of pulse width modulation (PWM) switching signals that switchably control operation of respective switching circuits containing first and second electronic power switching devices coupled between respective power supply terminals, and having phase nodes thereof coupled through inductors to multiphase regulated voltage output voltage terminals, said multiphase synthetic ripple voltage regulator comprising:

a master ripple voltage generator which is operative to generate a master ripple voltage waveform having a first waveform portion defined in accordance with a first current proportional to the difference between an input and output voltage of said regulator, and having a second waveform portion defined in accordance with a second current proportional to the difference between ground and said output voltage;

a hysteretic comparator which is operative to generate a master clock waveform in accordance with said first portion of said master ripple voltage waveform reaching an upper voltage threshold, and said second portion of said master ripple voltage reaching a lower voltage threshold;

a plurality of phase ripple voltage generators, a respective one of which is operative to generate a respective phase ripple voltage waveform defined in accordance with a current proportional to the difference between an associated phase node voltage and said output voltage of said regulator; and a plurality of PWM latch circuits, states of which define durations of respective components of a multiphase synthesized ripple voltage, a respective PWM latch circuit being coupled to have a first state thereof initiated by a selected master clock signal, and a second state thereof defined by an associated phase voltage comparator that monitors a respective phase ripple voltage.

19. The multiphase synthetic ripple voltage regulator according to claim 18, further including a sequence circuit which is coupled to place a respective PWM latch circuit in said first state in accordance with a selected master clock waveform.

20. The multiphase synthetic ripple voltage regulator according to claim 19, wherein a respective phase voltage comparator is operative to initiate said second state of said respective PWM latch circuit in response to a difference between said phase voltage and said output voltage reaching said upper threshold voltage.

21. The multiphase synthetic ripple voltage regulator according to claim 18, wherein said lower threshold voltage corresponds to that produced by a hysteretic comparator.

22. The multiphase synthetic ripple voltage regulator according to claim 18, wherein said upper threshold voltage corresponds to the lower threshold voltage plus a voltage proportional to said output voltage.

23. The multiphase synthetic ripple voltage regulator according to claim 18, wherein said hysteretic comparator is operative to increase the frequency of said master clock waveform in response to a transient in output load.

* * * * *